United States Patent
Choueifati et al.

(10) Patent No.: US 10,520,020 B2
(45) Date of Patent: Dec. 31, 2019

(54) SUPPORT ASSEMBLY WITH MOVABLE BEARING ASSEMBLY

(71) Applicant: Hill Phoenix, Inc., Conyers, GA (US)

(72) Inventors: Jules G. Choueifati, Richmond, VA (US); Sujith Nishal Rasquinha, Bangalore (IN); Akhil Ramesh Hamsagar, Bangalore (IN)

(73) Assignee: Hill Phoenix, Inc., Conyers, GA (US)

( * ) Notice: Subject to any disclaimer, the term of this patent is extended or adjusted under 35 U.S.C. 154(b) by 19 days.

(21) Appl. No.: 15/904,692

(22) Filed: Feb. 26, 2018

(65) Prior Publication Data

US 2019/0264740 A1 Aug. 29, 2019

(51) Int. Cl.
*B60B 33/06* (2006.01)
*F16C 29/04* (2006.01)
(Continued)

(52) U.S. Cl.
CPC ........ *F16C 29/046* (2013.01); *B60B 33/0005* (2013.01); *B60B 33/0039* (2013.01);
(Continued)

(58) Field of Classification Search
CPC ............... Y10T 16/188; Y10T 16/1887; Y10T 16/1889; Y10T 16/1891; Y10T 16/195; B60B 29/002; B60B 30/10; B60B 33/00; B60B 33/001; B60B 33/0018; B60B 33/0002; B60B 33/0023; B60B 33/0026; B60B 33/04; B60B 33/0042; B60B 33/0044; B60B 33/0005; B60B 33/0039;
(Continued)

(56) References Cited

U.S. PATENT DOCUMENTS 1,431,634 A * 10/1922 Clements .................. A47L 5/34
15/351
1,490,890 A * 4/1924 Derschug ............ B60B 33/0002
16/29
(Continued)

FOREIGN PATENT DOCUMENTS

JP 02-024177 A 1/1990
JP 2002-002053 A 1/2002
(Continued)

OTHER PUBLICATIONS

International Search Report dated Apr. 12, 2016 in International Appl. No. PCT/JP2016/000120 with English-language translation (2 pgs.).

*Primary Examiner* — Chuck Y Mah
(74) *Attorney, Agent, or Firm* — Foley & Lardner LLP

(57) ABSTRACT

A support assembly includes a body and a bearing assembly. The body defines a first opening. The bearing assembly is selectively repositionable within the first opening. The bearing assembly includes a housing, a socket, and a ball. The housing defines a second opening. The socket is positioned at least partly within the second opening and coupled to the housing. The ball bearing is positioned within the socket. The ball bearing is configured to rotate with respect to the housing. The bearing assembly is selectively repositionable between a first position, where the ball bearing extends from the body, and a second position, where the ball bearing does not extend from the body.

25 Claims, 7 Drawing Sheets

(51) Int. Cl.
*F16C 11/06* (2006.01)
*B60B 33/00* (2006.01)
*B65D 25/10* (2006.01)
*B65G 39/09* (2006.01)

(52) U.S. Cl.
CPC ........ *F16C 11/0623* (2013.01); *B65D 25/107* (2013.01); *B65G 39/09* (2013.01)

(58) Field of Classification Search
CPC . B62B 230/08; B62B 230/10; B62B 2202/02; B62B 2202/10; B62B 2202/12; B62B 2206/02; B62B 5/0083; B62B 5/0086; B62B 3/02; B62B 3/002; B62B 1/12; B62B 1/16; B62B 1/264; A47B 91/06; A47B 91/12; A47B 91/16; B65D 25/107; B65G 39/09
See application file for complete search history.

(56) References Cited

U.S. PATENT DOCUMENTS

| | | | | |
|---|---|---|---|---|
| 1,532,064 A * | 3/1925 | Neiswender | ........ | B60B 33/0002 16/21 |
| 2,425,675 A * | 8/1947 | Graff | ........ | B60B 33/04 16/19 |
| 2,745,117 A * | 5/1956 | Sands | ........ | A47C 19/021 16/29 |
| 3,466,697 A * | 9/1969 | Goodrich | ........ | B60B 33/08 16/26 |
| 3,744,083 A * | 7/1973 | Jenkins | ........ | B60B 33/08 16/26 |
| 4,576,391 A * | 3/1986 | Gerstner | ........ | B60B 33/0002 16/30 |
| 4,696,583 A * | 9/1987 | Gorges | ........ | B60B 33/08 16/26 |
| 5,423,561 A * | 6/1995 | Sadow | ........ | A45C 5/14 190/18 A |
| 5,740,584 A * | 4/1998 | Hodge | ........ | B60B 33/0002 16/30 |
| 6,450,515 B1 * | 9/2002 | Guth | ........ | B60B 33/0063 16/30 |
| 6,457,865 B1 * | 10/2002 | Masciarelli, Jr. | ...... | B65G 13/12 16/26 |
| 7,159,829 B1 * | 1/2007 | Finkelstein | ........ | B60B 33/04 108/144.11 |
| 7,305,737 B2 * | 12/2007 | Libakken | ........ | B60B 33/08 16/35 R |
| 7,578,028 B2 * | 8/2009 | Sellars | ........ | B60B 33/08 16/20 |
| 2005/0036812 A1 | 2/2005 | Carriere et al. | | |
| 2006/0143862 A1 | 7/2006 | Dominic et al. | | |
| 2008/0172829 A1 * | 7/2008 | White | ........ | B60B 33/0002 16/29 |
| 2009/0056070 A1 * | 3/2009 | James | ........ | B60B 33/0002 16/45 |
| 2016/0278543 A1 | 9/2016 | Choueifati | | |

FOREIGN PATENT DOCUMENTS

| | | |
|---|---|---|
| JP | 2003-011454 A | 1/2003 |
| JP | 2007-502221 A | 2/2007 |

* cited by examiner

SUPPORT ASSEMBLY WITH MOVABLE BEARING ASSEMBLY

BACKGROUND

The present application relates generally to a support assembly. In particular, this application relates to a support assembly with a retractable bearing.

Generally speaking, support assemblies may support a structure on a surface. Often times, these support assemblies include wheels, such as casters, that include a lock to selectively resist motion of an associated support assembly with respect to the surface. In these arrangements, the wheels support the load of the structure on the surface. Over time, the locks may become worn, thereby decreasing the resistance provided by the lock to motion of the support assembly with respect to the surface. As a result, unintended movement of the structure may occur. Additionally, the wheels typically represent a significant portion of the financial cost of the support assemblies.

SUMMARY

One embodiment of the present disclosure is related to a support assembly. The support assembly includes a body and a bearing assembly. The body defines a first opening. The bearing assembly is selectively repositionable within the first opening. The bearing assembly includes a housing, a socket, and a ball. The housing defines a second opening. The socket is positioned at least partly within the second opening and coupled to the housing. The ball bearing is positioned within the socket. The ball bearing is configured to rotate with respect to the housing. The bearing assembly is selectively repositionable between a first position, where the ball bearing extends from the body, and a second position, where the ball bearing does not extend from the body.

Another embodiment of the present disclosure is related to a support assembly for supporting a refrigerated case on a surface. The support assembly includes a body and a bearing assembly. The body defines an opening. The body includes a first aperture and a second aperture. The first aperture extends through the body and into the opening. The first aperture is aligned along a first axis. The first aperture is configured to selectively receive a first fastener. The second aperture extends through the body and into the opening. The second aperture is aligned along a second axis orthogonal to the first axis. The second aperture is configured to selectively receive a second fastener. The bearing assembly is selectively repositionable within the opening along a third axis. The bearing assembly includes a ball bearing configured to rotate with respect to the body. The third axis is parallel to the second axis.

Yet another embodiment of the present disclosure is related to a support assembly for supporting a refrigerated case on a surface. The support assembly includes a body, a ball bearing, and a coupling assembly. The body defines an opening. The ball bearing is configured to rotate with respect to the body and selectively positionable within the opening in a position where the ball bearing supports the refrigerated case on the surface. The coupling assembly is coupled to the body. The coupling assembly is configured to selectively receive a rail for supporting the support assembly above the surface and thereby supporting the refrigerated case above the surface.

Yet another embodiment of the present disclosure is related to a refrigerated display case. The refrigerated display case includes a frame, a support assembly, and a rail. The support assembly is coupled to the frame. The support assembly includes a body, a bearing assembly, and a sleeve. The body has a first opening. The bearing assembly is disposed within the first opening and has a ball bearing selectively extendable and retractable with respect to the first opening. The sleeve has a second opening. The rail has one or more casters coupled thereto. The rail is removably disposed within the second opening.

It is to be understood that both the foregoing general description and the following detailed description are exemplary and explanatory only and are not restrictive of the invention as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

I. Overview

Currently, a structure, such as a refrigerated case, may include wheels on a bottom surface to facilitate moving of the structure. These wheels may include locks to resist movement of the structure once the structure has been moved into a desired location. In some applications, these locks may become worn or become unintentionally disengaged and the resistance to movement of the structure may decrease, thereby unintentionally facilitating movement of the structure. Further, the wheels and locks may be relatively expensive. Alternatively, a structure may include stationary legs or posts upon which the structure may rest. These legs may not facilitate movement of the structure but instead function merely to support the structure off the ground. However, such an arrangement is undesirable because movement of the structure is relatively difficult.

An opportunity for providing support to a structure with an assembly that selectively facilitates movement of the structure and that is relatively impervious to the same degradation of current wheel and lock assemblies would be advantageous. The embodiments described herein are directed to a support assembly that includes a movable bearing assembly that is selectively repositionable by repositioning fasteners with respect to a body of the support assembly such that a ball bearing extends from the body, and thereby facilitates movement of a structure coupled to the support assembly, or is retracted within the body, and thereby does not facilitate movement of the structure. The embodiments described herein also describe a coupling assembly coupled to the support assembly that facilitates the selective coupling of a rail assembly to the support assembly to facilitate movement of the structure using casters, as opposed to the ball bearings. In this way, the support assembly can be configured to facilitate movement using the casters (e.g., for movement during manufacturing or assembly of the structure, etc.) or using the ball bearing (e.g., for alignment of the structure in a final installation procedure, etc.) or to not facilitate movement of the structure (e.g., non-movable placement at a usage destination, etc.).

II. Application of the Support Assembly

Figure 1:
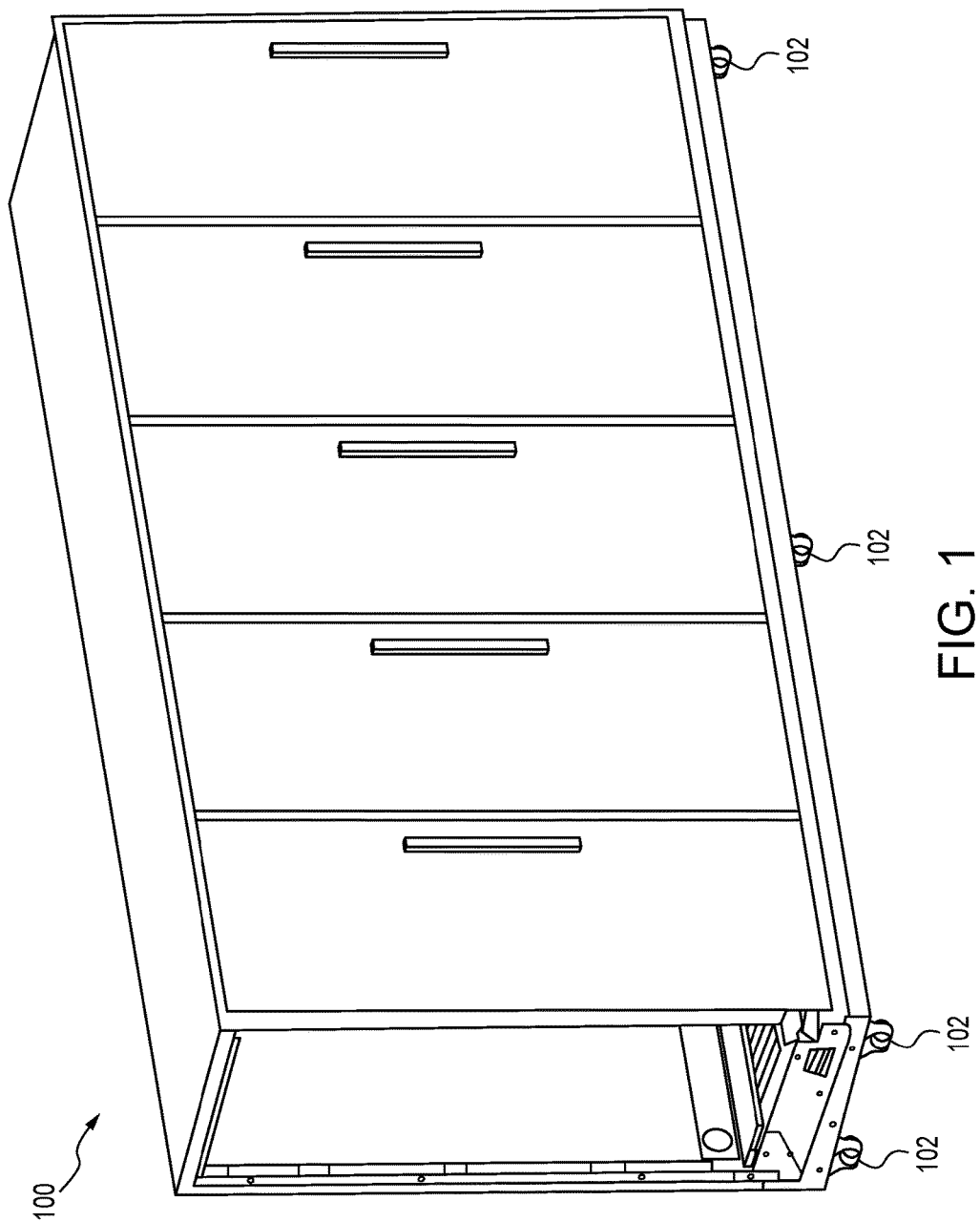
FIG. 1 is a top perspective view of a refrigerated case incorporating a plurality of support assemblies, according to an exemplary embodiment of the present disclosure.
Figure 2:
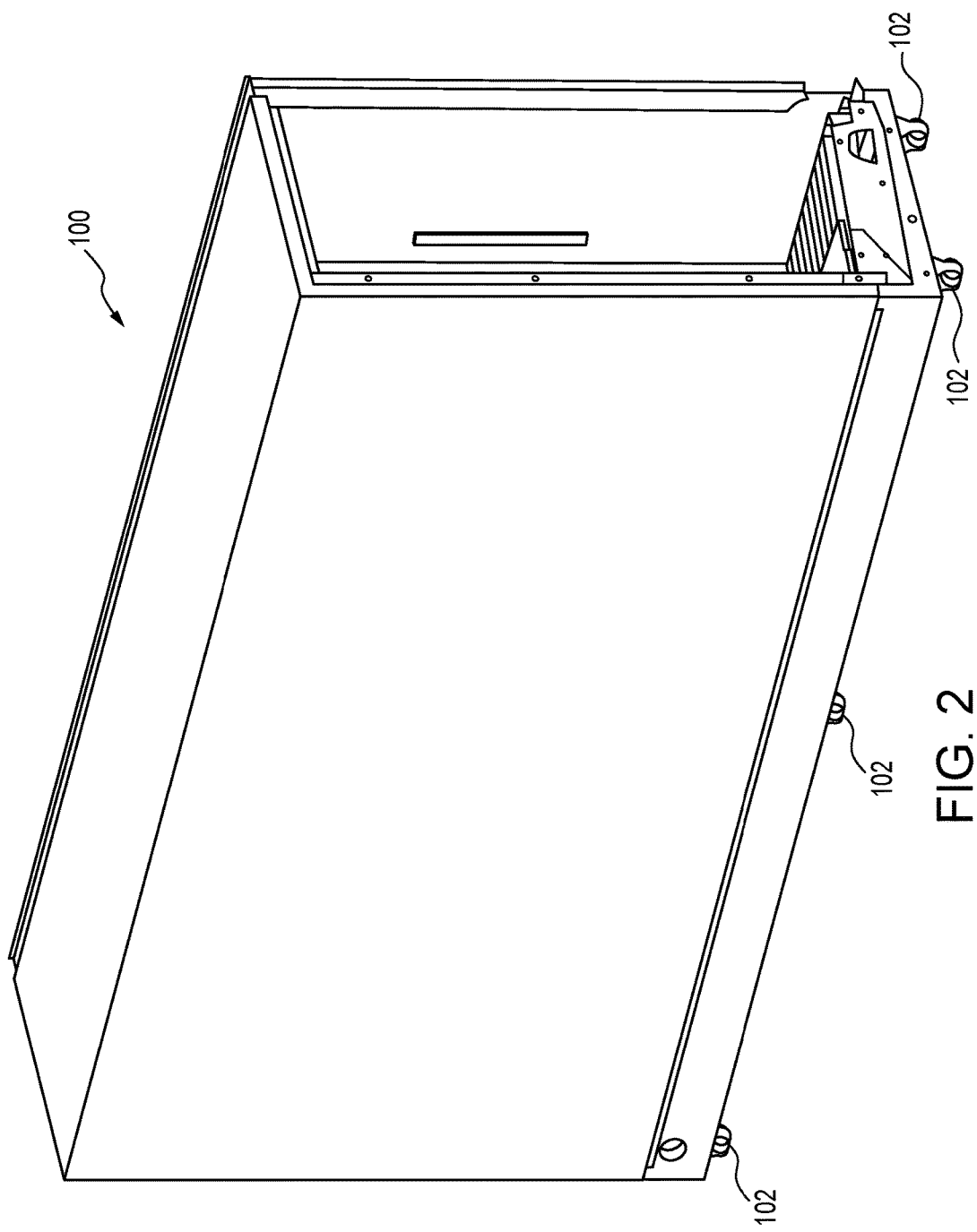
FIG. 2 is a rear perspective view of the refrigerated case shown in FIG. 1.

Referring to FIGS. 1 and 2, a structure, shown as a refrigerated case (e.g., freezer case, display case, refrigerated display case, etc.) 100 is illustrated. The refrigerated case 100 is used in the storage of goods (e.g., refrigerated goods, frozen goods, foods, beverages, etc.). For example, the refrigerated case 100 may be utilized in the storage of frozen foods in a supermarket. The refrigerated case 100 may include a plurality of doors and shelves, the doors openable to facilitate access to goods supported on the shelves. The refrigerated case 100 may be modular such that a plurality of the refrigerated cases 100 can be aligned and interconnected to form a continuous row of the refrigerated cases 100. In this way, the refrigerated case 100 can be adapted to suit the requirements of a target application. While not shown, it is understood that the refrigerated case 100 includes any and all necessary refrigeration infrastructure including, but not limited to, a condenser, an evaporator, a pump, an accumulator, a fan, coolant lines, a coolant tank, and other similar components.

The refrigerated case 100 also includes a plurality of supports (e.g., legs, bases, stands, etc.), shown as support assemblies 102. The support assemblies 102 are configured to support the refrigerated case 100 on a surface (e.g., floor, ground, etc.). The refrigerated case 100 may define a load (e.g., a force due to gravity, etc.) that is transferred to the surface through the support assemblies 102. The support assemblies 102 are configured to cooperatively bear the load of the refrigerated case 100, even when the refrigerated case 100 is fully loaded with goods. The support assemblies 102 are positioned along the refrigerated case 100 such that the load of the refrigerated case 100 is evenly distributed amongst the support assemblies 102.

As shown in FIGS. 1 and 2, the support assemblies 102 are arranged along a perimeter of a bottom side of the refrigerated case 100. Specifically, four of the support assemblies 102 are arranged at corners of the perimeter of the bottom side of the refrigerated case 100. Additionally, two of the support assemblies 102 are shown as arranged at midpoints of two parallel sides of the perimeter of the bottom side of the refrigerated case 100. The refrigerated case 100 may be supported by additional or fewer of the support assemblies 102 depending on the application of the refrigerated case 100.

III. The Support Assembly

Figure 3:
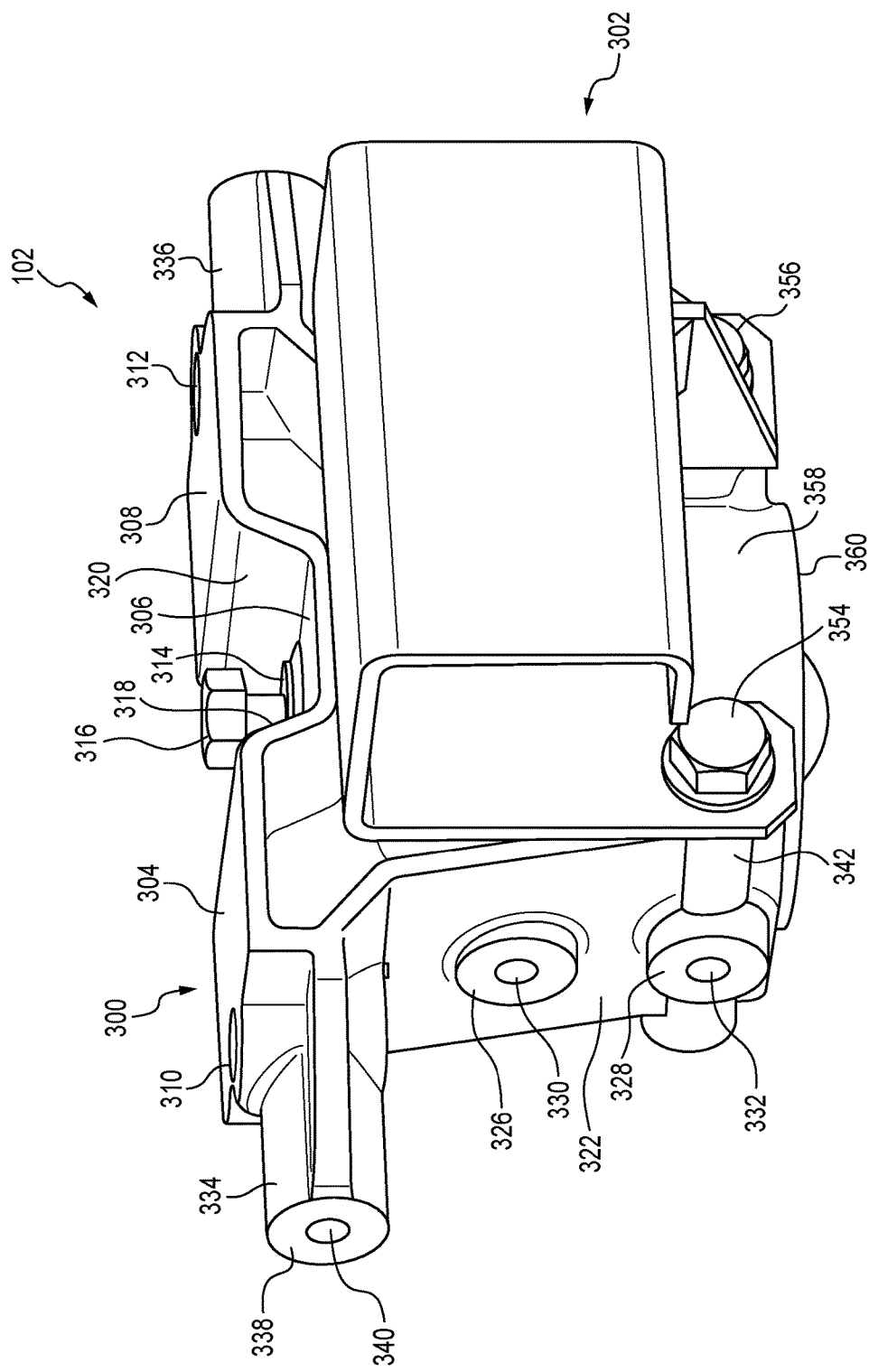
FIG. 3 is a top perspective view of a support assembly, such as the support assemblies shown in FIG. 1.
Figure 4:
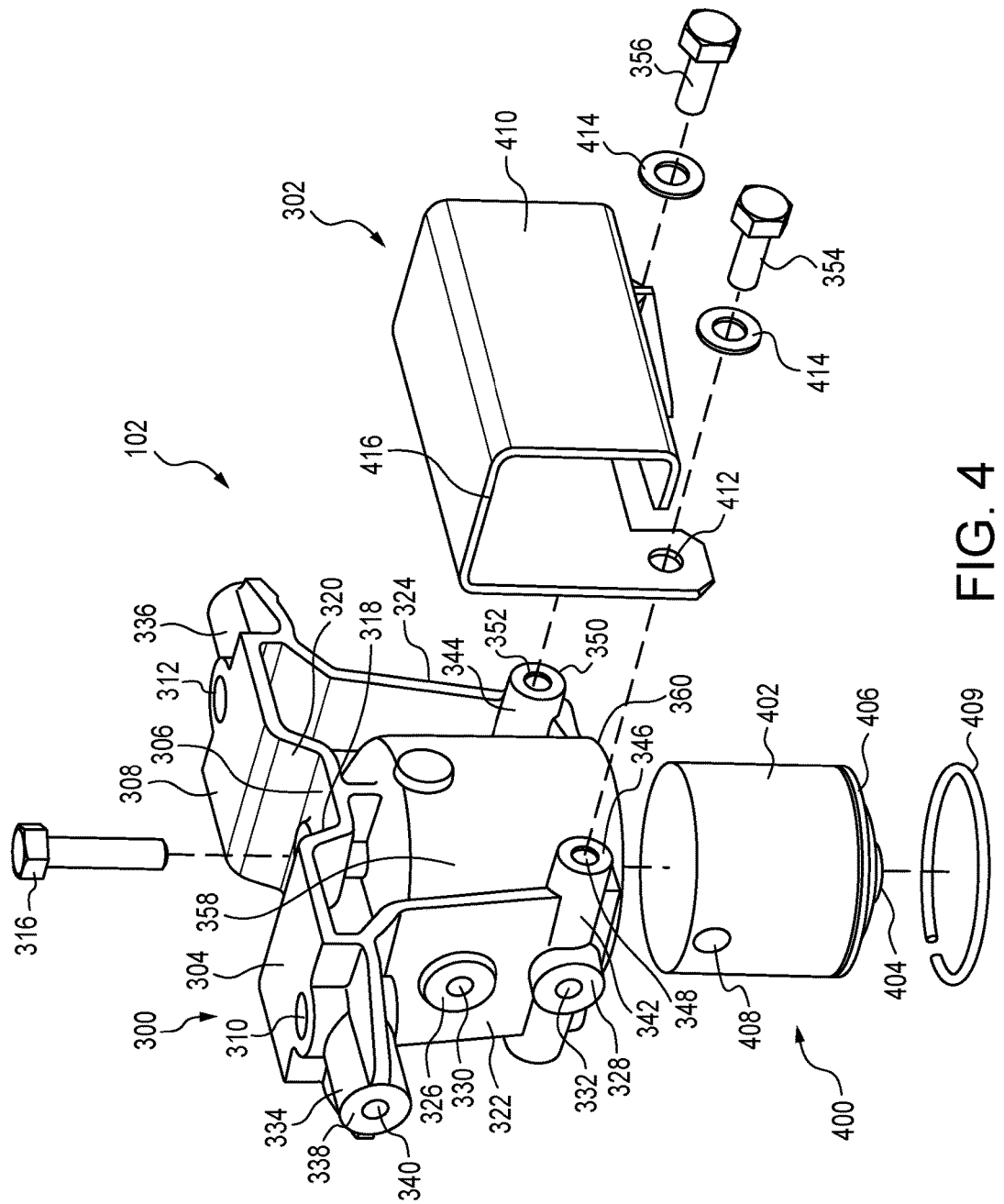
FIG. 4 is an exploded view of the support assembly shown in FIG. 3.

FIGS. 3 and 4 illustrate the support assembly 102 in greater detail. The support assembly 102 includes a structure (e.g., base, etc.), shown as a body 300, and an assembly (e.g., system, mechanism, etc.), shown as a coupling assembly (e.g., sleeve, etc.) 302. The body 300 includes a first surface (e.g., side, face, etc.), shown as a first top surface 304, a second surface, shown as a second top surface 306, and a third surface, shown as a third top surface 308. The first top surface 304 and the third top surface 308 are generally disposed along a first plane. The second top surface 306 is disposed along a second plane parallel to, and offset from, the first plane such that the second top surface 306 is inset relative to the first top surface 304 and the third top surface 308. The body 300 may be cast from, for example, aluminum or a composite material (e.g., polymeric material, resin-based material, etc.).

The first top surface 304 includes an aperture (e.g., opening, hole, recess, etc.), shown as an aperture 310, and the third top surface 308 includes an aperture, shown as an aperture 312. The aperture 310 and the aperture 312 are each configured to receive (e.g., structured to receive, capable of receiving, etc.) a fastener (e.g., bolt, screw, threaded fastener, etc.) to couple (e.g., attach, connect, etc.) each of the first top surface 304 and the third top surface 308, and therefore the body 300 and the support assembly 102, to a structure, such as the refrigerated case 100 shown in FIGS. 1 and 2. For example, the aperture 310 and the aperture 312 may receive fasteners to couple the support assembly 102 to a portion of the perimeter of the bottom side of the refrigerated case 100.

The second top surface 306 also includes an aperture, shown as an aperture 314, that is configured to receive a fastener, shown as a fastener 316. As opposed to the aperture 310 and the aperture 312, which cooperate with fasteners to couple the support assembly 102 to a structure, such as the refrigerated case 100, the aperture 314 and the fastener 316 do not cooperate to couple the support assembly 102 to the structure. Instead, the aperture 314 and the fastener 316 cooperate to adjust a position of a bearing within the support assembly 102, as will be described in more detail herein. In an exemplary embodiment, the aperture 314 is centered on the second top surface 306 such that the body 300 is symmetrical about a first plane bisecting the aperture 314 and a second plane bisecting the aperture 314 and orthogonal to the first plane. The offset of the plane along which the second top surface 306 disposed from the plane along which the first top surface 304 and the third top surface 308 are disposed may be based on, for example, a thickness of a head of the fastener 316.

The body 300 also includes a fourth surface, shown as a first curved surface 318, and a fifth surface, shown as a second curved surface 320. The first curved surface 318 is contiguous with both the first top surface 304 and the second top surface 306, such that the first curved surface 318 is downward sloping from the first top surface 304 to the second top surface 306. Similarly, the second curved surface 320 is contiguous with both the third top surface 308 and the second top surface 306, such that the second curved surface 320 is downward sloping from the third top surface 308 to the second top surface 306.

The body 300 also includes a sixth surface, shown as a first side surface 322, and a seventh surface, shown as a second side surface 324. The first side surface 322 is opposite the second side surface 324. The first side surface 322 includes a first extension (e.g., boss, protuberance, protrusion, etc.), shown as a first extension 326, and a second extension, shown as a second extension 328. The first extension 326 defines an aperture, shown as an aperture 330, that is configured to receive a fastener. Similarly, the second extension 328 defines an aperture, shown as an aperture 332, that is configured to receive a fastener.

In an exemplary embodiment, the aperture 332 receives a fastener for securing a panel (e.g., kick plate, etc.) or a bracket (e.g., anti-tilt bracket, etc.) to the body 300, and therefore to the support assembly 102. In contrast, the aperture 330, in this exemplary embodiment, receives a fastener that is movable to adjust a position of a bearing within the support assembly 102, as will be described in more detail herein.

The first extension 326 and the second extension 328 may be configured such that an end face of the first extension 326 is generally coplanar with an end face of the second extension 328. Due to the symmetry of the body 300, it is understood that the second side surface 324 includes extensions and apertures as described with respect to the first side surface 322 and as will be described in more detail herein.

The body 300 also includes a first projection (e.g., protuberance, protrusion, extension, etc.), shown as a first projecting structure 334, and a second projection, shown as a second projecting structure 336. The first projecting structure 334 is contiguous with the first side surface 322 and the first top surface 304. Similarly, the second projecting structure 336 is contiguous with the second side surface 324 and the third top surface 308. The first projecting structure 334 includes a third extension, shown as a third extension 338. The third extension 338 defines an aperture, shown as an aperture 340, that is configured to receive a fastener. For example, the aperture 340 may receive a fastener for securing a panel or a bracket to the body 300, and therefore to the support assembly 102. Due to the symmetry of the body 300, it is understood that the second projecting structure 336 includes extensions and apertures as described with respect to the first projecting structure 334 and as will be described in more detail herein.

The body 300 also includes a third projection, shown as a third projecting structure 342, and a fourth projection, shown as a fourth projecting structure 344. The third projecting structure 342 is defined by a first central axis and the fourth projecting structure 344 is defined by a second central axis parallel to the first central axis. Both of the first central axis and the second central axis may be orthogonal to a central axis of any one of the aperture 340, the aperture 330, and the aperture 332.

The third projecting structure 342 includes a fourth extension, shown as a fourth extension 346, which defines an aperture, shown as an aperture 348, that is configured to receive a fastener. Similarly, the fourth projecting structure 344 includes a fifth extension, shown as a fifth extension 350, which defines an aperture, shown as an aperture 352, that is configured to receive a fastener. As shown in FIG. 4, the aperture 348 receives a fastener, shown as a fastener 354, and the aperture 352 receives a fastener, shown as a fastener 356. The fastener 354 and the fastener 356 cooperate to secure the coupling assembly 302 to the third projecting structure 342, and therefore to the support assembly 102.

The body 300 also includes a receptacle (e.g., container, etc.), shown as a sleeve 358, positioned between the first side surface 322, the second side surface 324, the first top surface 304, the second top surface 306, and the third top surface 308. The sleeve 358 defines an aperture, shown as a central opening 360. In some embodiments, the central opening 360 is machined into the body 300 (e.g., via a milling operation, etc.). The central opening 360 is defined by a central axis. According to some embodiments, the central axis of the central opening 360 is orthogonal to a plane upon which the first top surface 304 is disposed, a plane upon which the second top surface 306 is disposed, and/or a plane upon which the third top surface 308 is disposed. In some embodiments, the central axis of the central opening 360 is coincident with a central axis of the aperture 314.

The support assembly 102 also includes an assembly, shown as a bearing assembly 400. The bearing assembly 400 is selectively coupled to the body 300. The bearing assembly 400 cooperates with the body 300 to provide a support from the support assembly 102 to a structure that is coupled to the support assembly 102. The bearing assembly 400 includes a housing (e.g., cylinder, etc.), shown as a housing 402. The housing 402 is selectively repositionable within the central opening 360 of the sleeve 358. The bearing assembly 400 also includes a bearing, shown as a ball bearing 404, and a structure, shown as a socket 406. The ball bearing 404 is positioned, in part, within the housing 402 and partially extends from the housing 402. The socket 406 is at least partially positioned (e.g., contained, etc.) within the housing 402 and the socket 406 is coupled to the housing 402. Similarly, the ball bearing 404 is positioned within the socket 406. The socket 406 cooperates with the housing 402 to contain the ball bearing 404 therein. For example, the socket 406 may be welded or fastened to the housing 402. The ball bearing 404 may be constructed from, for example, carbon steel or nylon.

The housing 402 also includes an aperture, shown as an aperture 408. The aperture 408 is orthogonal to, and intersects, a central axis of the sleeve 358 and extends through the housing 402. The aperture 408 is configured such that, when the housing 402 is inserted within the central opening 360, the housing 402 can be selectively repositioned with respect to the sleeve 358 such that the aperture 408 is aligned with, for example, the aperture 330. In other applications the housing 402 may be repositioned such that the aperture 408 is aligned with other apertures. The bearing assembly 400 also includes a seal, shown as a seal 409, that is configured to be placed between the housing 402 and/or the socket 406 and the sleeve 358. The seal 409 may be constructed from carbon spring steel.

The coupling assembly 302 includes a bracket (e.g., a coupler, etc.), shown as a bracket 410, that is configured to be selectively coupled to the body 300. The bracket 410 is coupled to the body 300 through the use of the fastener 354 and the fastener 356. The bracket 410 includes an aperture, shown as a hole 412, that is configured to selectively receive the fastener 354, and another aperture, not shown, configured to selectively receive the fastener 356. The coupling assembly 302 is also shown to include washers (e.g., spacers, bushings, etc.), shown as washers 414, configured to be positioned between the fastener 354 and bracket 410 and between the fastener 356 and the bracket 410. The bracket 410 may be constructed from, for example, grade 8 steel.

The bracket 410 defines an aperture, shown as an opening 416. As will be described in more detail herein, the opening 416 is configured to receive a rail for supporting the support assembly 102 above the surface. The bracket 410 may be variously configured such that the opening 416 has a target configuration. As shown in FIG. 4, the opening 416 is generally square and functions to receive a rail of generally square shape. However, the opening 416 may be rectangular, hexagonal, or otherwise shaped to receive a rail of a different configuration.

To assemble the support assembly 102, the bearing assembly 400 is first assembled. In an exemplary embodiment, the socket 406 is pressed over the ball bearing 404 and into the housing 402 such that the ball bearing 404 is captured within the socket 406 or between the housing 402 and the socket 406. Next, the bearing assembly 400 is inserted into the central opening 360 of the body 300. The seal 409 is then placed within the central opening 360 such that the seal 409 is maintained in a recession within the central opening 360. Next, the coupling assembly 302 is attached to the body 300 by aligning the hole 412 and the second hole on the bracket 410 with the aperture 348 and the aperture 352, respectively, and inserting the fastener 354 and the fastener 356 therethrough. Next, a fastener, such as the fastener 316, is inserted into the aperture 330, the aperture 606, and/or the aperture 314. Next, the bearing assembly 400 may be positioned using the fastener. As a result of these operations, the support assembly 102 has been assembled. The support assembly 102 may then be coupled to the refrigerated case 100 by inserting fasteners through the aperture 310 and the aperture 312 into apertures in the refrigerated case 100. Finally, a rail assembly, as will be further described herein, may then be coupled to the support assembly 102. Other processes for assembling the support assembly 102 are similarly possible.

IV. Movement of the Support Assembly

Figure 5:
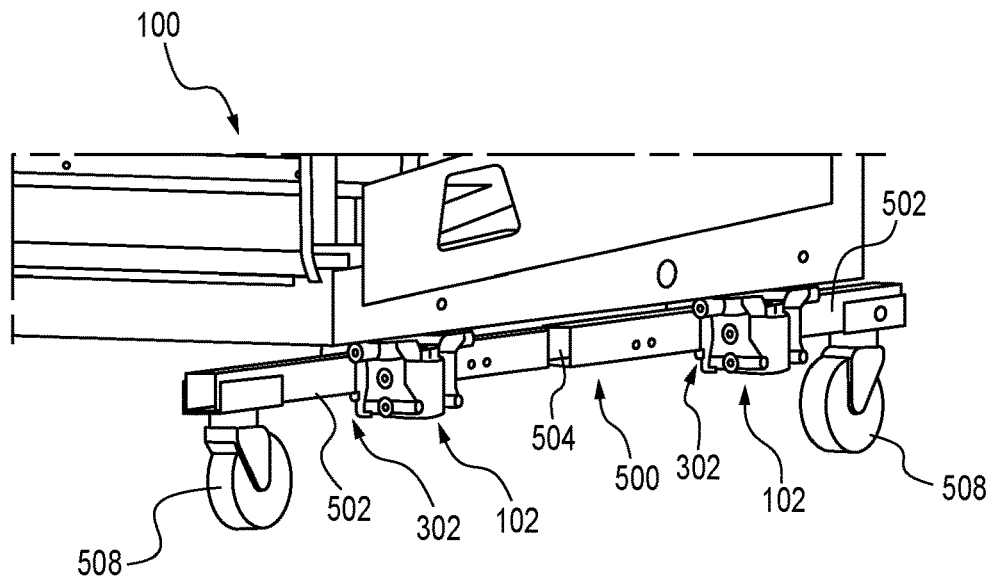
FIG. 5 is a perspective view of two support assemblies, such as the support assembly shown in FIG. 3, coupled to a refrigerated case, such as the refrigerated case shown in FIG. 1, and of a rail assembly coupled thereto.

As shown in FIG. 5, the support assembly 102 is mounted to the refrigerated case 100. Additionally, an assembly, shown as a rail assembly 500, is coupled to each of the support assemblies 102. Specifically, the rail assembly 500 includes members, shown as rail members 502, that are each positioned within the openings 416 of the coupling assemblies 302 of the support assemblies 102. The rail assembly 500 includes a member, shown as a connecting member 504, positioned between the rail members 502. The rail members 502 are selectively repositionable with respect to the connecting member 504. For example, the connecting member 504 may include a pin, and the rail member 502 may include a detent (e.g., recess, depression, etc.), or a plurality of detents, configured to receive the pin. Through movement of the rail members 502 relative to the connecting member 504, each of the rail members 502 can be decoupled from the other of the rail members 502 by decoupling the rail member 502 from the connecting member 504. The rail assembly 500 also includes two wheels (e.g., movement members, etc.), shown as casters 508. The casters 508 may be rotatable three-hundred and sixty degrees. Each of the casters 508 is coupled to one of the rail members 502.

In use, the casters 508 facilitate movement of the refrigerated case 100. For example, the refrigerated case 100 may be moved between manufacturing stations (e.g., between an assembly station and an electrical wiring station, etc.) using the casters 508. The casters 508 may eliminate the need for heavy machinery (e.g., a forklift, a skid loader, etc.) to move the refrigerated case 100. When the rail assembly 500 is coupled to the support assembly 102, the support assembly 102 may not contact the surface upon which the casters 508 move. When the rail assembly 500 is decoupled from the support assembly 102, a portion of the support assembly 102 contacts the surface.

Through the use of the rail assembly 500, assembly and installation of the refrigerated case 100, or any other structure utilizing the support assemblies 102, may be substantially less expensive. In some applications, the rail assembly 500 is utilized only in manufacturing of the refrigerated case 100 and is removed prior to shipping the refrigerated case 100 to a customer for installation. In these applications, the rail assembly 500 can be reused for assembly of other refrigerated cases 100. By being able to reuse the rail assembly 500, the support assemblies 102 are significantly less expensive than structures utilizing similar wheels.

The support assembly 102 is configured such that the bearing assembly 400 is operable between a first position, where the support assembly 102 may be easily moved with respect to a surface upon which the support assembly 102 is resting, and a second position, where the support assembly 102 is not be easily moved with respect to a surface upon which the support assembly 102 is resting. In the first position, the bearing assembly 400 extends (e.g., protrudes, etc.) from the support assembly 102. In the second position, the bearing assembly 400 is retracted within the support assembly 102. In various applications, the bearing assembly 400 is in the first position when the rail assembly 500 is decoupled from the support assembly. The bearing assembly 400 may be in the first position when the ball bearing 404 is elevated from any surface due to the effect of gravity on the bearing assembly 400. Similarly, the bearing assembly 400 may not be in the first position when the ball bearing 404 contacts a surface simply due to the force of the surface on the on the ball bearing 404 causing a movement of the bearing assembly 400 within the central opening 360.

Figure 6:
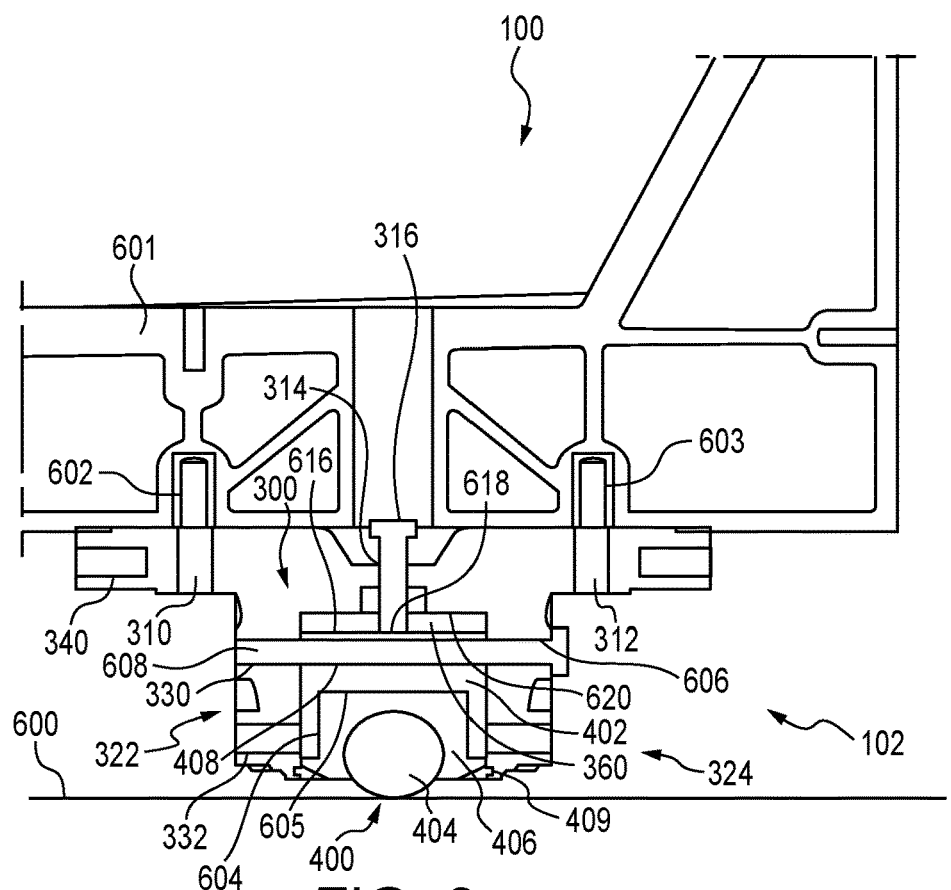
FIG. 6 is a cross-sectional view of a support assembly, such as the support assembly shown in FIG. 3, coupled to a refrigerated case, such as the refrigerated case shown in FIG. 1.

FIG. 6 illustrates the support assembly 102 in the first position, after the rail assembly 500 has been removed. For example, FIG. 6 may illustrate a configuration of the support assembly 102 after the refrigerated case 100 has been unloaded at an installation location (e.g., a customer's store, etc.). As shown in FIG. 6, the support assembly 102 is supported by the ball bearing 404 on a surface, shown as a surface 600. The support assembly 102 may be moved relative to the surface 600 by, for example, pushing the refrigerated case 100 which causes rotation of the ball bearing 404 within the socket 406 relative to the surface 600.

FIG. 6 also illustrates that the refrigerated case 100 includes a frame, shown as a frame 601, having an aperture, shown as an aperture 602, that is configured to be selectively aligned with the aperture 310, and another aperture, shown as an aperture 603, that is configured to be selectively aligned with the aperture 312. To couple the support assembly 102 to the refrigerated case 100, a first fastener (not shown) is positioned within the aperture 310 and the aperture 602 and a second fastener (not shown) is positioned within the aperture 312 and the aperture 603.

As shown in FIG. 6, the socket 406 is received within an opening, shown as an opening 604, in the housing 402. The opening 604 defines a face (e.g., side, etc.), shown as a stop 605. The socket 406 is positioned within the housing 402 such that the socket 406 contacts the stop 605. Accordingly, force on the ball bearing 404 from the surface 600 is transmitted to the socket 406 and then transmitted to the housing 402 via the stop 605. According to an example embodiment, the force is transmitted from the ball bearing 404 to the housing 402 without substantially translating the ball bearing 404 within the socket 406 or substantially translating the socket 406 within the housing 402.

When the bearing assembly 400 is in the first position, as shown in FIG. 6, the aperture 408 is aligned with the aperture 330 in the first side surface 322 and with an aperture, shown as an aperture 606, in the second side surface 324, and a fastener, shown as a fastener 608, is positioned therein. The fastener 608 may be positioned such that a head of the fastener 608 is aligned with a target side (e.g., a front side, a rear side, a left side, a right side, etc.)

of the refrigerated case 100. The target side may be a side that is most proximate to an exterior of the support assembly 102 such that a user may easily access the head of the fastener 608. Additionally, the fastener 608 may be representative of two fasteners: one positioned between the aperture 330 and the aperture 408 and the other positioned between the aperture 606 and the aperture 408.

The force from the surface 600 is then translated from the housing 402 to the fastener 608 and from the fastener 608 to the body 300. The force from the body 300 is further translated to the refrigerated case 100 through an interaction between the first top surface 304 and the refrigerated case 100 (e.g., a bottom surface of the refrigerated case 100, etc.) and an interaction between the third top surface 308 and the refrigerated case 100. In this way, the refrigerated case 100 may be supported by the ball bearing 404 when the bearing assembly 400 is in the first position.

As shown in FIG. 6, the support assembly 102 utilizes the fastener 316 to establish the position of the bearing assembly 400 within the body 300. The force on the ball bearing 404 from the surface 600 is translated to the housing 402, thereby causing the housing 402 to be biased upwards. When the bearing assembly 400 is in the first position, the fastener 316 extends into the central opening 360. Specifically, an end, shown as an end 618, of the fastener 316 extends past a stop, shown as a stop 620, within the central opening 360 a target distance. In an exemplary embodiment, the target distance is selected such that the aperture 330, the aperture 408, and the aperture 606 are aligned, thereby permitting the fastener 608 to be inserted therethrough. In this way, the bearing assembly 400 is in the first position when the top surface 616 of the housing 402 contacts the end 618 of the fastener 316 and when the end 618 is the target distance away from the stop 620.

Figure 7:
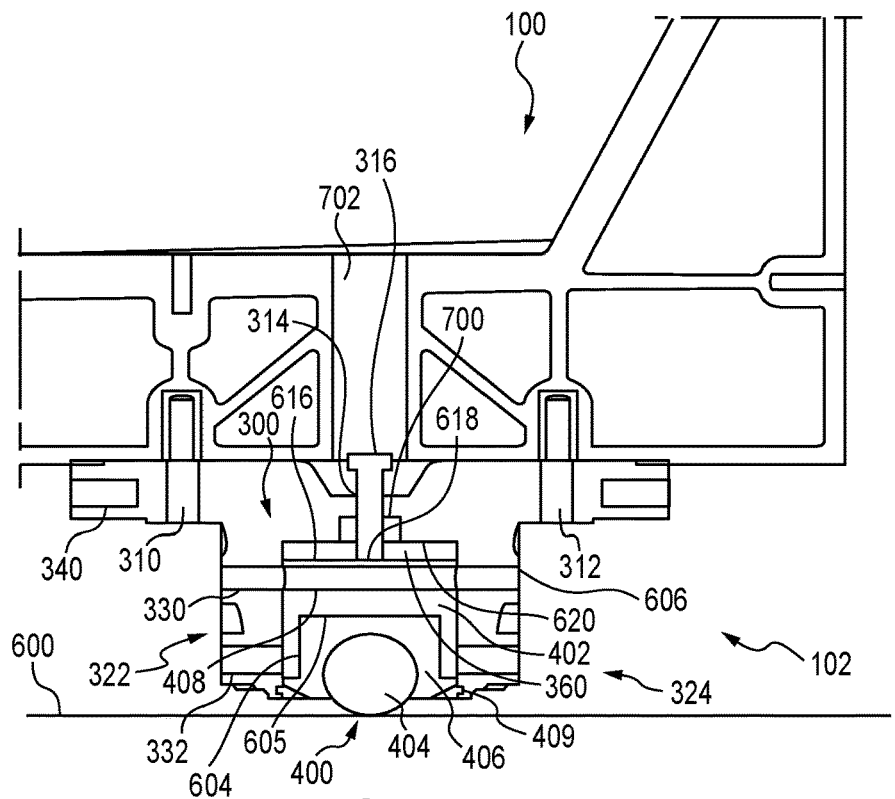
FIG. 7 is another cross-sectional view of a support assembly, such as the support assembly shown in FIG. 3, coupled to a refrigerated case, such as the refrigerated case shown in FIG. 1.

To move the bearing assembly 400 from the first position to the second position (e.g., to retract the bearing assembly 400 within the sleeve 358, etc.) the fastener 608 is first removed. As shown in FIG. 7, the load of the refrigerated case 100 is then supported only by the fastener 316. The fastener 316 is selectively repositionable within the aperture 314. For example, the fastener 316 may threadably engage the aperture 314 such that the fastener 316 can be drawn into and out of the aperture 314 (e.g., via a drill, via a screw driver, via an impact driver, etc.). Additionally or alternatively, the body 300 may incorporate a structure, shown as a threaded structure 700, that threadably engages the fastener 316. For example, the threaded structure 700 may be a nut that is pressed into the aperture 314.

As shown in FIG. 7, the refrigerated case 100 also includes a channel, shown as an access channel 702 that is positioned over the aperture 314, and therefore the fastener 316, when the support assembly 102 is coupled to the refrigerated case 100. The access channel 702 provides access to the fastener 316 when the support assembly 102 is coupled to the refrigerated case 100. For example, a user may insert a socket or implement through the access channel 702 to draw the fastener 316 into and out of the aperture 314.

Figure 8:
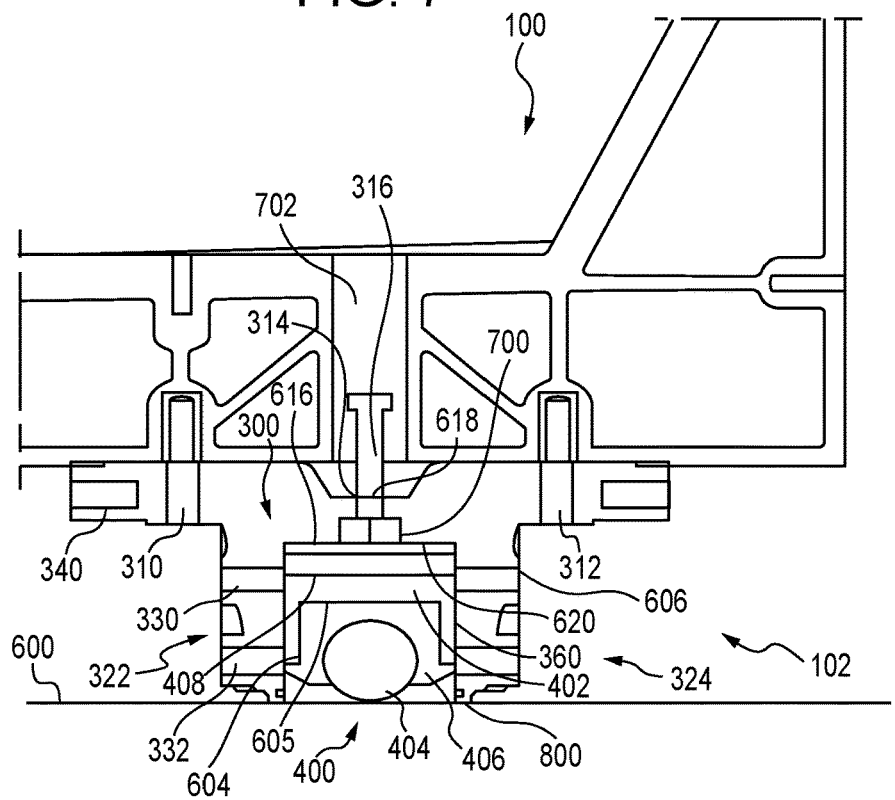
FIG. 8 is yet another cross-sectional view of a support assembly, such as the support assembly shown in FIG. 3, coupled to a refrigerated case, such as the refrigerated case shown in FIG. 1.

To continue to move the bearing assembly 400 from the first position to the second position, the fastener 316 is drawn out of the aperture 314, causing the housing 402 to move gradually upwards within the central opening 360 until the top surface 616 of the housing 402 contacts the stop 620. When the top surface 616 of the housing 402 contacts the stop 620, the bearing assembly 400 is in the second position, as shown in FIG. 8. In this position, the ball bearing 404 is positioned within the central opening 360 and does not facilitate movement of the support assembly 102 with respect to the surface 600. Instead, a portion, shown as a rim 800, of the body 300 contacts the surface 600. The rim 800 circumscribes the central opening 360, and bears the load of the refrigerated case 100 when the bearing assembly 400 is in the second position.

Through the use of the bearing assembly 400, the refrigerated case 100, as well as any other structure having a load supported by the support assemblies 102, can be moved along the surface 600 while the bearing assembly 400 is in the first position and can be secured in a position relative to the surface 600 when the bearing assembly 400 is in the second position. For example, the refrigerated case 100 can be moved into an aisle and aligned with other refrigerated cases 100 in the aisle when the bearing assembly 400 is in the first position. Once the refrigerated case 100 has been properly aligned, the bearing assembly 400 can be transitioned to the second position such that the alignment of the refrigerated case 100 is maintained. In this way, the support assembly 102 provides flexibility in the movement and support of the refrigerated case 100.

In some embodiments, the support assembly 102 only incorporates one of the fastener 316 and the fastener 608. If the support assembly 102 incorporates the fastener 316 and not the fastener 608, the bearing assembly 400 can be simply transitioned between the first position and the second position by repositioning the fastener 316. If the support assembly 102 instead incorporates the fastener 608 and not the fastener 316, the bearing assembly 400 can be simply transitioned between the first position and the second position by removing the fastener 608. In either of these embodiments, it may be advantageous for a user to externally support the refrigerated case 100 when the bearing assembly 400 is transitioned between the first position and the second position. For example, a first user may lift the refrigerated case 100 (e.g., using a forklift, etc.) while a second user repositions the fastener 316.

Figure 9:
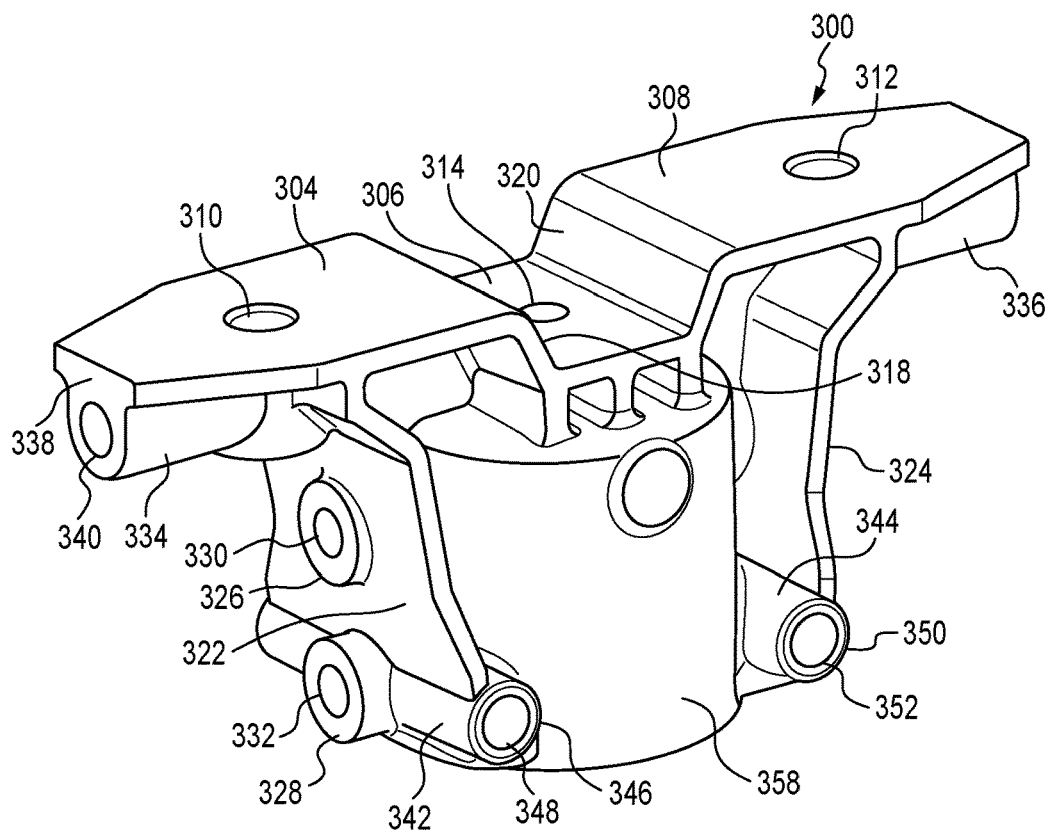
FIG. 9 is a top perspective view of a body for a support assembly, such as the support assembly shown in FIG. 3.
Figure 10:
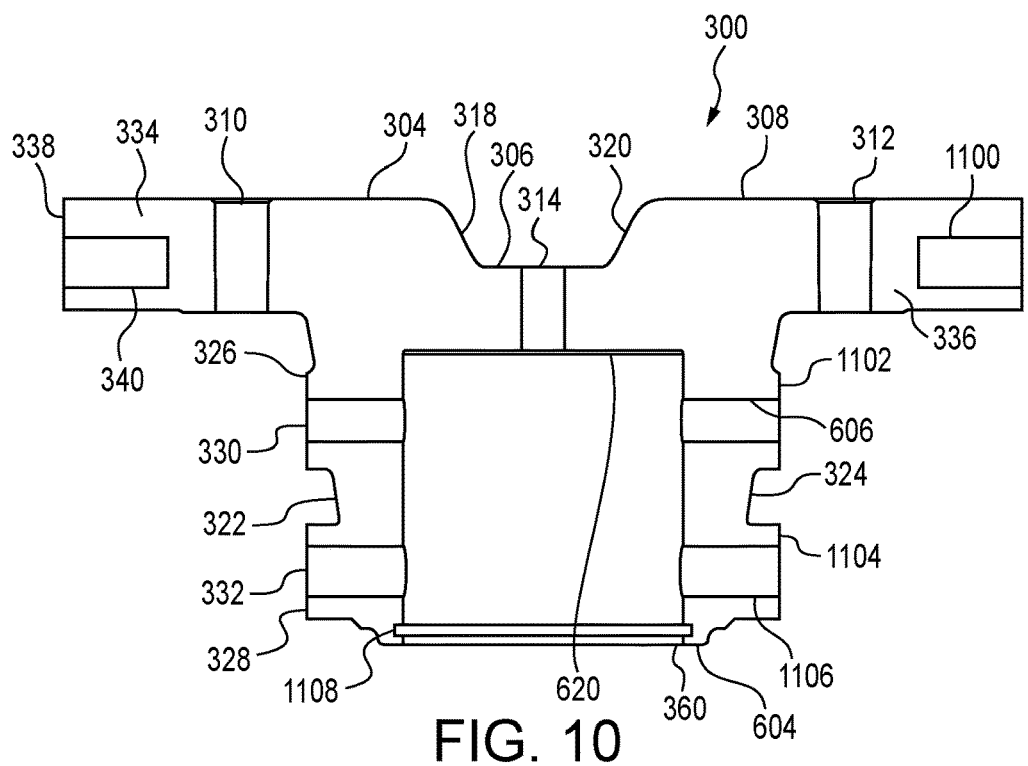
FIG. 10 is a cross-sectional view of the body for a support assembly shown in FIG. 9.

FIGS. 9 and 10 illustrate the body 300 according to another embodiment. As shown in FIGS. 9 and 10, the first top surface 304 extends over the first projecting structure 334 and the third top surface 308 extends over the second projecting structure 336. In this way, the first top surface 304 and the third top surface 308 are larger in the embodiment shown in FIGS. 9 and 10 than in the embodiment shown in FIGS. 3 and 4.

Additionally, FIG. 10 illustrates that the body 300 includes an aperture, shown as an aperture 1100, that is the same as the aperture 340 but positioned within the second projecting structure 336 as opposed to the first projecting structure 334. The second side surface 324 is shown as including a first extension, shown as a first extension 1102, and a second extension, shown as a second extension 1104. The first extension 1102 the aperture 606. Similarly, the second extension 1104 defines an aperture, shown as an aperture 1106. Additionally, FIG. 10 illustrates a region (e.g., groove, etc.), shown as a recession 1108, that receives the seal 409 within the central opening 360.

In an exemplary embodiment, the aperture 340 and the aperture 1100 are each ¼"-20 holes, the aperture 330 and the aperture 606 are each 5⁄16"-18 inch holes, the aperture 332 and the aperture 1106 are each ¼"-20 holes, the aperture 348 and the aperture 352 are each 5⁄16"-18 holes, and the aperture 314 is a 5⁄16"-18 hole.

In some applications, the bearing assembly 400 may also be operable in a third position where the aperture 332, the aperture 1106, and the aperture 408 are aligned such that the fastener 608 may be positioned therethrough. In this position, a height of the support assembly 102 is increased relative to a height of the support assembly 102 where the fastener 608 is positioned through the aperture 330, the aperture 606, and the aperture 408. The bearing assembly 400 may be operable in the first position and the third position and/or the second position. The support assembly 102 may also be operable in other positions by including other apertures in the body 300.

V. Configuration of Exemplary Embodiments

While the support assembly 102 has been shown and described with regard to the refrigerated case 100, it is understood that the support assembly 102 can be utilized with other structures, such as refrigerators, freezers, cabinets, counters, bars, shelfing units, displays (e.g., produce displays, etc.), and other similar structures.

As utilized herein, the terms "parallel," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. It is understood that the term "parallel" is intended to encompass de minimus variations as would be understood to be within the scope of the disclosure by those of ordinary skill in the art.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," "attached," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," etc.) are merely used to describe the orientation of various elements in the Figures. It should be noted that the orientation of various elements may differ according to other exemplary embodiments and that such variations are intended to be encompassed by the present disclosure.

The construction and arrangement of the elements of the support assembly 102 and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any of the apertures (e.g., the aperture 330, the aperture 332, the aperture 606, the aperture 1106, etc.) may not be included or may be replaced with internal holes, such that a fastener may be positioned within an aligned and adjacent aperture, may extend into the internal hole, and may not extend from the internal hole out of the body 300 adjacent the internal hole. Also, for example, the order or sequence of any process or method steps, such as the steps of assembling the support assembly 102, may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the appended claims.

What is claimed is:

1. A support assembly comprising:
   a body defining:
      a first opening,
      a first aperture extending through the body and into the first opening; and
      a second aperture extending through the body and into the first opening, the second aperture aligned with the first aperture; and
   a bearing assembly selectively repositionable within the first opening, the bearing assembly comprising:
      a housing defining a second opening and a third aperture extending through the housing and configured to be selectively aligned with the first aperture and the second aperture;
      a socket positioned at least partly within the second opening and coupled to the housing; and
      a ball bearing positioned within the socket, the ball bearing configured to rotate with respect to the housing;
   wherein the bearing assembly is selectively repositionable between a first position, where the ball bearing extends from the body, and a second position, where the ball bearing does not extend from the body.

2. The support assembly of claim 1, wherein the third aperture is aligned with the first aperture and the second aperture only when the bearing assembly is in the first position.

3. The support assembly of claim 1, wherein the body further comprises a fourth aperture extending through the body and into the first opening;
   wherein the first aperture and the second aperture are aligned along a first axis; and wherein the fourth aperture is aligned along a second axis orthogonal to the first axis.

4. The support assembly of claim 3, wherein the bearing assembly is selectively repositionable along a third axis parallel to the second axis.

5. The support assembly of claim 3, wherein the bearing assembly is selectively repositionable along the second axis.

6. The support assembly of claim 3, wherein the body defines a first surface disposed along a first plane, a second surface disposed along the first plane, and a third surface disposed along a second plane;
   wherein the third surface is contiguous with both the first surface and the second surface;
   wherein the first plane is parallel to, and offset from, the second plane; and
   wherein the fourth aperture is located on the third surface.

7. The support assembly of claim 1, further comprising a fastener configured to be selectively received in the first aperture, the second aperture, and the third aperture.

8. The support assembly of claim 1, further comprising a fastener;
   wherein the body further comprises a first aperture extending through the body and into the first opening; and
   wherein the fastener is configured to be selectively repositionable within the first aperture such that the fastener is configured to selectively contact the bearing assembly within the first opening.

9. The support assembly of claim 1, further comprising a coupling assembly coupled to the body, the coupling assembly configured to selectively receive a rail for supporting the support assembly above a surface.

10. The support assembly of claim 1, wherein the body is configured to be coupled to a structure;
    wherein the ball bearing is configured to bear a load of the structure on a surface when the bearing assembly is in the first position; and
    wherein the ball bearing is configured to facilitate movement of the structure relative to the surface when the bearing assembly is in the first position.

11. A support assembly for supporting a refrigerated case on a surface, the support assembly comprising:
    a body defining an opening and comprising:
       a first aperture extending through the body and into the opening, the first aperture aligned along a first axis, the first aperture configured to selectively receive a first fastener; and
       a second aperture extending through the body and into the opening, the second aperture aligned along a second axis orthogonal to the first axis, the second aperture configured to selectively receive a second fastener; and
    a bearing assembly selectively repositionable within the opening along a third axis, the bearing assembly comprising a ball bearing configured to rotate with respect to the body;
    wherein the third axis is parallel to the second axis.

12. The support assembly of claim 11, wherein the bearing assembly is selectively repositionable between a first position, where the ball bearing extends from the body, and a second position, where the ball bearing does not extend from the body;
    wherein the ball bearing bears a load of the refrigerated case on the surface when the bearing assembly is in the first position; and
    wherein the ball bearing does not bear the load of the refrigerated case on the surface when the bearing assembly is in the second position.

13. The support assembly of claim 12, wherein the ball bearing is configured to facilitate movement of the refrigerated case relative to the surface when the bearing assembly is in the first position.

14. The support assembly of claim 11, wherein the body further comprises a third aperture extending through the body and into the opening; and
    wherein the third aperture is aligned along the first axis.

15. The support assembly of claim 11, further comprising a coupling assembly coupled to the body, the coupling assembly configured to selectively receive a rail for supporting the support assembly above the surface and thereby supporting the refrigerated case above the surface.

16. A support assembly for supporting a refrigerated case on a surface, the support assembly comprising:
    a body defining an opening;
    a ball bearing configured to rotate with respect to the body and selectively positionable within the opening in a position where the ball bearing supports the refrigerated case on the surface;
    a coupling assembly coupled to the body, the coupling assembly configured to selectively receive a rail for supporting the support assembly above the surface and thereby supporting the refrigerated case above the surface;
    a first fastener; and
    a housing configured to be selectively repositionable within the opening;
    wherein the body further comprises:
       a first aperture extending through the body and into the opening, the first aperture configured to selectively receive the first fastener; and
       a second aperture extending through the body and into the opening, the second aperture aligned with the first aperture, the second aperture configured to selectively receive the first fastener; and
    wherein the ball bearing is partially positioned within the housing;
    wherein the housing comprises a third aperture, the third aperture configured to be selectively aligned with the first aperture and the second aperture, the third aperture configured to selectively receive the first fastener.

17. The support assembly of claim 16, wherein the first fastener is positionable with the first aperture, the second aperture, and the third aperture simultaneously such that the ball bearing is selectively positioned within the opening to support the refrigerated case on the surface.

18. The support assembly of claim 16, further comprising a second fastener;
    wherein the body further comprises:
       a fourth aperture extending through the body and into the opening, the fourth aperture configured to selectively receive the second fastener;
       wherein (i) the first fastener is positionable with the first aperture, the second aperture, and the third aperture simultaneously and (ii) the second fastener is positionable within the fourth aperture, such that the first fastener and the second fastener cooperate to selectively position the ball bearing within the opening to support the refrigerated case on the surface.

19. A refrigerated display case, comprising:
a frame;
a support assembly coupled to the frame, the support assembly comprising:
 a body having a first opening;
 a bearing assembly disposed within the first opening and having a ball bearing selectively extendable and retractable with respect to the first opening; and
 a sleeve having a second opening; and
a rail with one or more casters coupled thereto, the rail removably disposed within the second opening;
wherein the one or more casters are configured to engage a support surface when the ball bearing is retracted and to disengage the support surface when the ball bearing is extended.

20. The refrigerated display case of claim 19, further comprising a panel, and wherein the panel is coupled to the support assembly.

21. The refrigerated display case of claim 19, wherein the support assembly further comprises a fastener operable to adjust a position of the ball bearing, and wherein the frame comprises a channel providing access to the fastener.

22. A support assembly comprising:
a body defining a first opening and a first aperture extending through the body and into the first opening;
a bearing assembly selectively repositionable within the first opening, the bearing assembly comprising:
 a housing defining a second opening;
 a socket positioned at least partly within the second opening and coupled to the housing; and
 a ball bearing positioned within the socket, the ball bearing configured to rotate with respect to the housing;
a fastener configured to be selectively repositionable within the first aperture such that the fastener is configured to selectively contact the bearing assembly within the first opening;
wherein the bearing assembly is selectively repositionable between a first position, where the ball bearing extends from the body, and a second position, where the ball bearing does not extend from the body.

23. The support assembly of claim 22, wherein the body is configured to be coupled to a structure;
wherein the ball bearing is configured to bear a load of the structure on a surface when the bearing assembly is in the first position; and
wherein the ball bearing is configured to facilitate movement of the structure relative to the surface when the bearing assembly is in the first position.

24. A refrigerated display case, comprising:
a frame;
a support assembly coupled to the frame, the support assembly comprising:
 a body having a first opening;
 a bearing assembly disposed within the first opening and having a ball bearing selectively extendable and retractable with respect to the first opening; and
 a sleeve having a second opening; and
a rail with one or more casters coupled thereto, the rail removably disposed within the second opening;
wherein the support assembly further comprises a fastener operable to adjust a position of the ball bearing, and wherein the frame comprises a channel providing access to the fastener.

25. The refrigerated display case of claim 24, wherein the frame supports an enclosure having doors and shelves configured for the storage of refrigerated or frozen goods.

* * * * *